(12) United States Patent
Maki (10) Patent No.: US 7,912,943 B2
(45) Date of Patent: Mar. 22, 2011

(54) NETWORK DEVICE, NETWORK SYSTEM, AND ITS POWER SAVING CONTROL METHOD

(75) Inventor: Nobuhiko Maki, Shinagawa-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 472 days.

(21) Appl. No.: 11/534,503

(22) Filed: Sep. 22, 2006

(65) Prior Publication Data

US 2007/0124440 A1 May 31, 2007

(30) Foreign Application Priority Data

Oct. 6, 2005 (JP) ................................. 2005-293815

(51) Int. Cl.
*G06F 15/173* (2006.01)
(52) U.S. Cl. ........................ 709/224; 370/312; 455/13.4
(58) Field of Classification Search ................... 709/224
See application file for complete search history.

(56) References Cited

U.S. PATENT DOCUMENTS

| | | | | |
|---|---|---|---|---|
| 6,020,973 | A * | 2/2000 | Levine et al. | 358/1.15 |
| 6,134,401 | A * | 10/2000 | Yun et al. | 399/70 |
| 7,107,442 | B2 * | 9/2006 | Cheshire | 713/1 |
| 7,286,252 | B2 * | 10/2007 | Kawabuchi et al. | 358/1.15 |
| 2002/0016151 | A1 * | 2/2002 | Romans | 455/13.4 |
| 2002/0141394 | A1 * | 10/2002 | Hardisty | 370/352 |
| 2004/0259542 | A1 * | 12/2004 | Viitamaki et al. | 455/426.2 |
| 2005/0170868 | A1 * | 8/2005 | Fischer | 455/574 |
| 2005/0233704 | A1 * | 10/2005 | Maekawa | 455/69 |
| 2005/0254444 | A1 * | 11/2005 | Meier et al. | 370/312 |
| 2005/0259584 | A1 * | 11/2005 | Chen et al. | 370/238 |
| 2006/0002383 | A1 * | 1/2006 | Jeong et al. | 370/360 |
| 2006/0007924 | A1 * | 1/2006 | Sadot | 370/389 |
| 2006/0101109 | A1 * | 5/2006 | Nishio | 709/200 |
| 2006/0126533 | A1 * | 6/2006 | Wang | 370/254 |
| 2006/0187864 | A1 * | 8/2006 | Wang et al. | 370/311 |
| 2006/0265473 | A1 * | 11/2006 | Muto | 709/218 |
| 2007/0207765 | A1 * | 9/2007 | Nakahara et al. | 455/343.1 |
| 2008/0194201 | A1 * | 8/2008 | Sinivaara et al. | 455/41.2 |
| 2008/0216116 | A1 * | 9/2008 | Pekonen et al. | 725/39 |
| 2008/0232286 | A1 * | 9/2008 | Habetha et al. | 370/311 |
| 2008/0248768 | A1 * | 10/2008 | Doi et al. | 455/127.5 |
| 2008/0259895 | A1 * | 10/2008 | Habetha et al. | 370/345 |

FOREIGN PATENT DOCUMENTS

| | | |
|---|---|---|
| JP | 2001-043038 | 2/2001 |
| JP | 2001-075687 A | 3/2001 |
| JP | 2004-158966 | 6/2004 |
| JP | 2005-094681 | 4/2005 |
| JP | 2005-215856 | 8/2005 |

* cited by examiner

*Primary Examiner* — Firmin Backer
*Assistant Examiner* — Hamza Algibhah
(74) *Attorney, Agent, or Firm* — Canon U.S.A., Inc., IP Division (57) ABSTRACT

A network device has a power saving function, wherein the network device shifts to a power saving mode depending on a transition condition and returns from the power saving mode depending on a return condition. The network device includes a first notifying unit adapted to transmit notification information indicating that the network device shifts to the power saving mode by a multicast via the network and a second notifying unit adapted to transmit the notification information indicating that the network device shifts to the power saving mode by a unicast via the network.

7 Claims, 9 Drawing Sheets

| DEVICE ADDRESS (901) | STATE (902) |
|---|---|
| ADDRESS OF MULTIFUNCTION DEVICE 101 | NORMAL MODE |
| • | • |
| • | • |
| • | • |

FIG. 9B

| DEVICE ADDRESS (901) | STATE (902) |
|---|---|
| ADDRESS OF MULTIFUNCTION DEVICE 101 | POWER SAVING MODE |
| • | • |
| • | • |
| • | • |

STORAGE MEDIUM SUCH AS FD/CD-ROM

DIRECTORY INFORMATION

FIRST PROCESSING PROGRAM IN NETWORK DEVICE PROGRAM CODE GROUP CORRESPONDING TO STEP OF FLOW CHART SHOWN IN FIG. 6

FIG. 10

MEMORY MAP OF STORAGE MEDIUM

FIG. 11

STORAGE MEDIUM SUCH AS FD/CD-ROM

| DIRECTORY INFORMATION |
|---|
| FIRST PROCESSING PROGRAM IN INFORMATION PROCESSING DEVICE<br>PROGRAM CODE GROUP CORRESPONDING TO STEP OF FLOW CHART SHOWN IN FIG. 8 |
|  |

MEMORY MAP OF STORAGE MEDIUM

NETWORK DEVICE, NETWORK SYSTEM, AND ITS POWER SAVING CONTROL METHOD

BACKGROUND OF THE INVENTION

1. Field of the Invention

The present invention relates to a power saving control of a network device and a network system.

2. Description of the Related Art

Various methods for cutting off the power supply of a CPU in a power saving mode have already been put into practical use so as to meet the standards of energy saving, which have been increasingly strict in recent years.

On the other hand, however, a need to rapidly return from a power saving mode to a normal mode is increasing for a network device such as a network-ready printer or multifunction device.

In addition, a size of a program increases in the multifunction device or the like of recent date and cost increase is concerned if all programs are stored in a ROM. Therefore, in some cases a hard disk may be also used as an image storing unit and programs may be stored in a partial area.

However, in this case, the programs are downloaded from the hard disk to a RAM after the device is activated, and then, the programs is executed on the RAM. Therefore, this contradicts the above-described need for rapid return.

Therefore, various methods for cutting off the power supply of a CPU while storing the program expanded on the RAM have been put into practical use.

In addition, transition to the power saving mode may be performed when the operation has not been carried out on an operational panel within a fixed time period and no inquiry and no data reception has been made from other devices on the network. On the other hand, the transition from the power saving mode may also performed when a particular operation is carried out on the operational panel or an inquiry or data reception has been made from any other device on the network.

In Japanese Patent Laid-Open No. 2001-75687, a power management device, which manages a power saving state of a printer or some other device, is notified that the device has transitioned into a sleep mode by a broadcast. On the other hand, upon detecting a service request for the device on a network, the power management device that has received the notification restores the device from the power saving state. This improves the power saving efficiency of the device on the network.

In the conventional art, however, there is a case where a monitoring device and application software for monitoring the state of the device by regularly acquiring state information for the device are located on the network. In such a case, due to an inquiry of monitoring transmitted from a monitoring device or the like, the device is unable to transition to the power saving mode. Alternatively, there is a problem such that the device is immediately restored from the power saving mode due to the above inquiry even if the device is able to transition to the power saving mode.

The periodic monitoring inquiries can be problematic when there are many devices and application software for monitoring the state of a network device (e.g., network-ready printer, multifunction image forming device).

SUMMARY OF THE INVENTION

To resolve or at least mitigate the above problems, embodiments of the present invention have been provided. Therefore, in accordance with an aspect of the present invention, a method is provided to realize more efficient power saving control in a network device provided with a power saving mode.

According to a first aspect of the present invention, there is provided a network device having a power saving function, wherein the network device shifts to a power saving mode depending on a transition condition and returns from the power saving mode depending on a return condition. The network device includes a first notifying unit adapted to transmit notification information indicating that the network device shifts to the power saving mode by a multicast via a network, and a second notifying unit adapted to transmit the notification information indicating that the network device shifts to the power saving mode by a unicast via the network.

Furthermore, according to a second aspect of the present invention, there is provided a network system including a network device and one or plural information processing devices. The network device has a power saving function, wherein the network device shifts to a power saving mode depending on a transition condition and returns from the power saving mode depending on a return condition. The plural information processing devices are capable of communicating with the network device via a network. The network device includes a first notifying unit adapted to transmit notification information indicating that the network device shifts to the power saving mode by a multicast via the network and a second notifying unit adapted to transmit the notification information indicating that the network device shifts to the power saving mode by a unicast via the network. Each of the plural information processing devices includes an acquiring unit adapted to acquire information related to the network device from the network device and a controlling unit adapted to stop acquisition of information by the acquiring unit in response to receiving of the notification information indicating that the network device shifts to the power saving mode from the network device.

Furthermore, according to a third aspect of the present invention, there is provided an information processing device capable of communicating with a network device having a power saving function. The network device shifts to a power saving mode depending on a transition condition and returns from the power saving mode depending on a return condition. The information processing device includes an acquiring unit adapted to acquire information related to the network device from the network device, a receiving unit adapted to receive notification information indicating that the network device shifts to the power saving mode, and a controlling unit adapted to stop acquisition of information by the acquiring unit in response to receiving of the notification information by the receiving unit.

Furthermore, according to a fourth aspect of the present invention, there is provided an information processing device capable of communicating with a network device having a power saving function. The network device shifts to a power saving mode depending on a transition condition and returns from the power saving mode depending on a return condition. The information processing device includes an acquiring unit adapted to periodically acquire information related to the network device from the network device, a receiving unit adapted to receive notification information indicating that the network device shifts to the power saving mode, and a controlling unit adapted to change a period for acquisition of information by the acquiring unit from a first period to a second period longer than the first period in response to receiving of the notification information by the receiving unit.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

DESCRIPTION OF THE EMBODIMENTS

Hereinbelow, detailed descriptions of the embodiments of the present invention will be given with reference to the accompanying drawings.

First Embodiment

Figure 1:
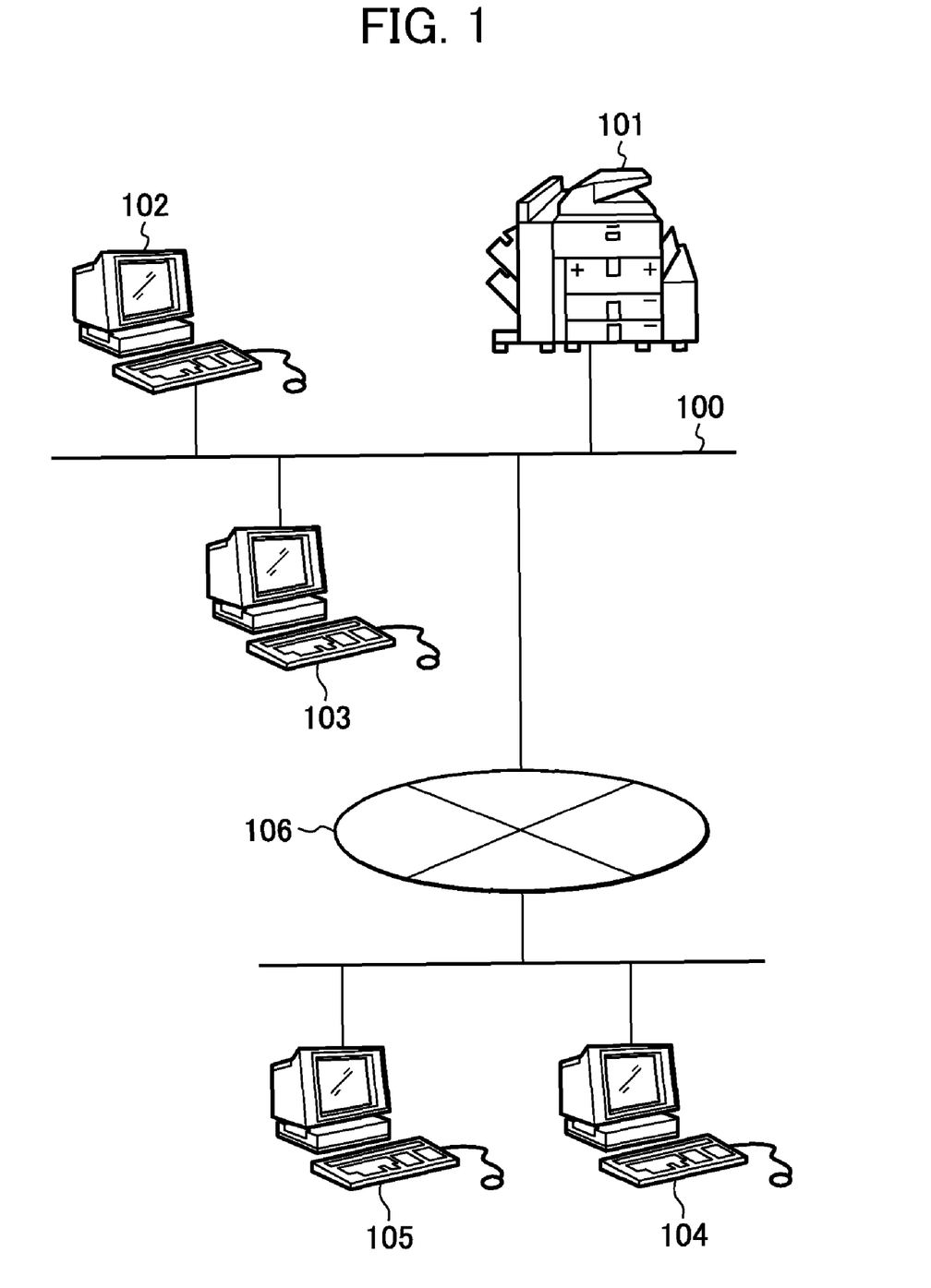
FIG. 1 is a block diagram of a network system, which can employ a network device and an information processing device according to an embodiment of the present invention.

FIG. 1 is a block diagram of a network system, which can employ a network device and an information processing device according to an embodiment of the present invention.

In FIG. 1, a reference numeral 101 denotes a multifunction device and this multifunction device 101 corresponds to a network device according to an embodiment of the present invention. This multifunction device 101 has a network connection function and it is connected to a network via a LAN 100. In addition, the multifunction device 101 provides various services such as a network print service and a scan service.

Further, a personal computer (PC) 102 and a PC 103 are connected to the network via the LAN 100. These PC 102 and PC 103 correspond to the PCs that are connected in the same segment to the multifunction device 101 on the network.

In addition, a PC 104 and a PC 105 correspond to PCs that are connected to the network via an intranet (or the Internet) 106 seen from the multifunction device 101.

In the present embodiment, it is assumed that a multicast packet transmitted from the multifunction device 101 can arrive at the PC 102 and the PC 103. However, it is assumed that the multicast packet transmitted from the multifunction device 101 can not arrive at the PC 104 and the PC 105 depending on the routing configuration or a limit on the number of hops.

In addition, the multifunction device 101 is configured so as to be capable of acquiring the state of the multifunction device 101 and information thereof from the PC 102 to the PC 105 (capable of monitoring the state) by using a SNMP or the like. The SNMP stands for a Simple Network Management Protocol. This SNMP is a protocol for monitoring and controlling communication devices that are connected to the TCP/IP network such as a router, a computer, and a terminal via the network. When using this SNMP, a device to be controlled (namely, the multifunction device 101) is provided with a management information database, which is referred to as a MIB (Management Information Base). The MIB stores and manages information, which is released to the public by a network device (the multifunction device 101) managed by the SNMP in order to inform them (namely, the PC 102 to the PC 105) about the state of itself.

Further, management of the state of the multifunction device 101 from the PC 102 to the PC 105 is not limited to the configuration using the SNMP but it may be performed in some other method.

Figure 2:
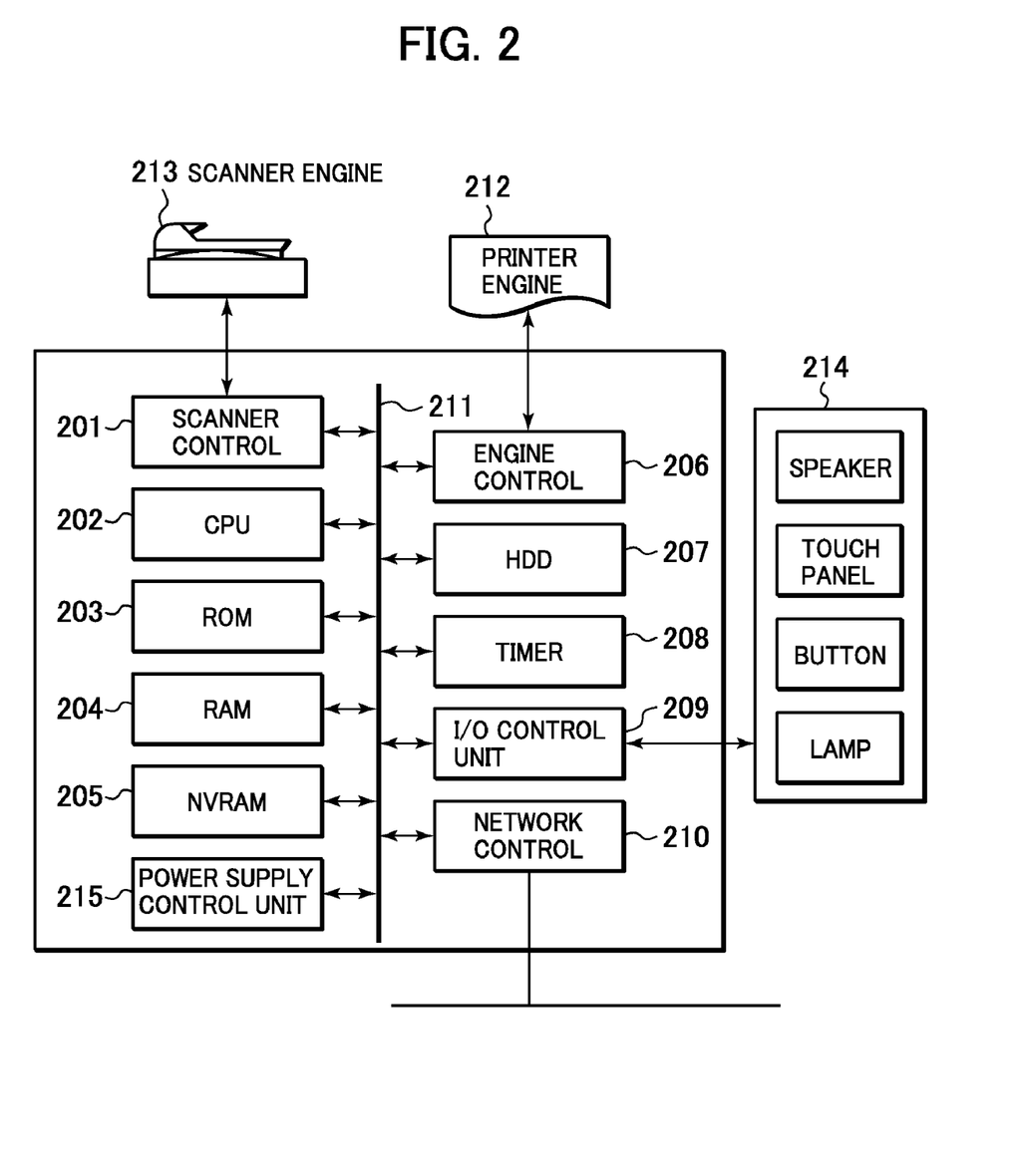
FIG. 2 is a block diagram showing the outline of a multifunction device 101 shown in FIG. 1.

FIG. 2 is a block diagram showing the outline of a multifunction device 101 shown in FIG. 1 and the same components as those of FIG. 1 are given the same reference numerals.

In FIG. 2, a reference numeral 201 denotes a scanner engine control unit and the scanner engine control unit 201 controls a scanner engine 213. A reference numeral 202 denotes a CPU. This CPU 202 is for use in controlling the entire multifunction device 101. A reference numeral 203 denotes a boot ROM (a ROM) and a boot program is stored therein. A reference numeral 204 denotes a RAM (a memory) and the RAM 204 is used as a work area of the CPU 202.

A reference numeral 205 denotes a nonvolatile RAM (a NVRAM) and the NVRAM 205 serves to store a value that is set by a panel. A reference numeral 206 denotes an engine control unit to control a printer engine 212. A reference numeral 207 denotes a hard disk drive (HDD) and a program for controlling a device or the like is stored therein. In addition, the HDD 207 can store image data, various data and devices or the like.

A reference numeral 208 denotes a timer. A reference numeral 209 denotes an I/O control unit to control a user interface part 214 including a speaker, a touch panel, a button, and a lamp. A reference numeral 210 denotes a network control unit to control communication with the LAN 100 and a reference numeral 215 denotes a power supply control unit. By controlling the power supply control unit 215, the multifunction device 101 can shift to the power saving mode.

Further, a reference numeral 211 denotes a bus and the above-described 201 to 210 and 215 are connected to this bus 211, respectively.

If a power supply is turned on, the CPU 202 reads a boot program from the ROM 203, and boots the device in accordance with control of this boot program. In addition, the CPU 202 expands a device control program from the HDD 207 to the RAM 204 in accordance with the boot program, and by reading the device control program expanded on the RAM 204, the CPU 202 controls the device.

Figure 3:
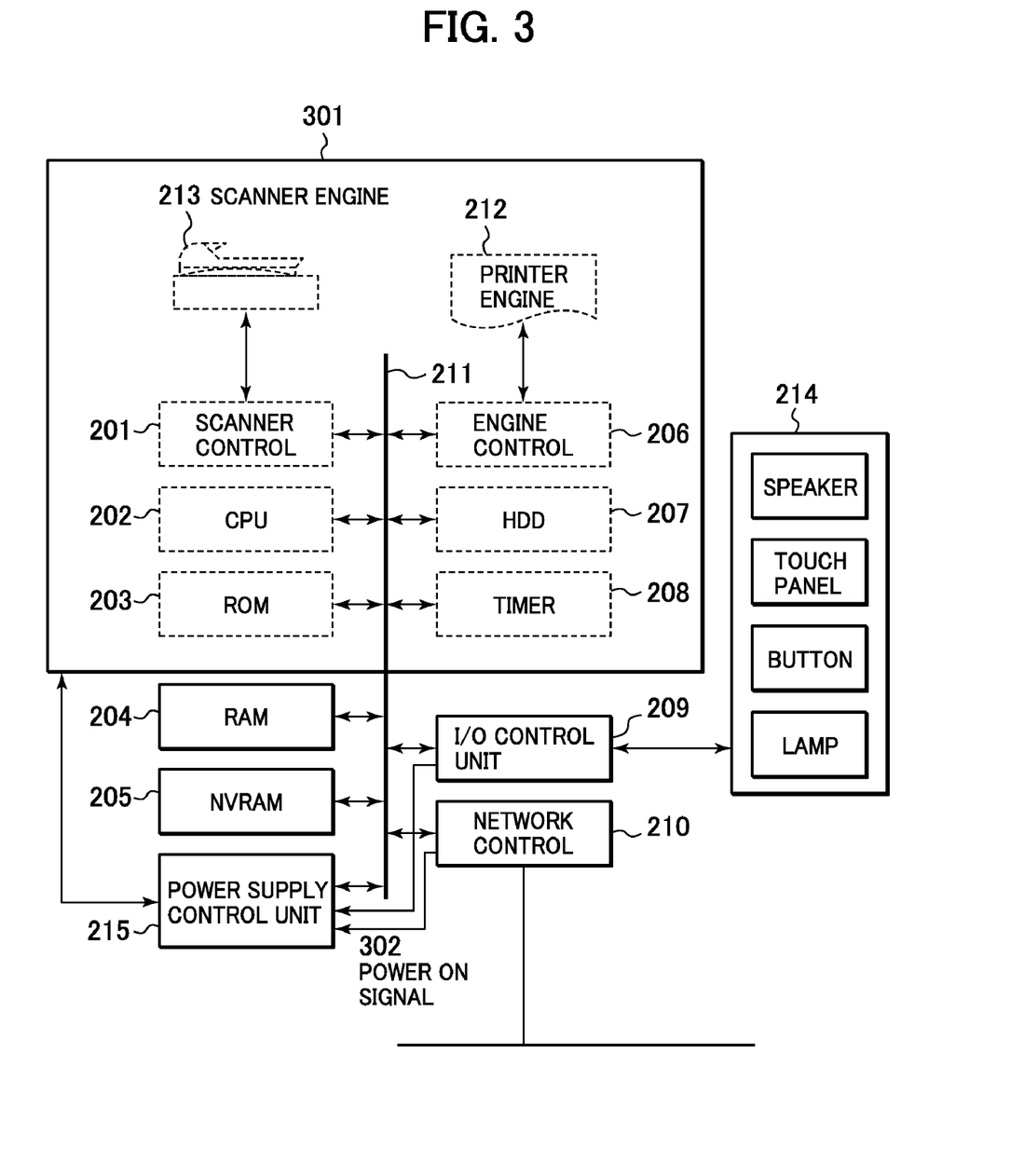
FIG. 3 is a diagram showing a power supply of which unit is cut off by a power supply control unit shown in FIG. 2.

FIG. 3 is a view showing a power supply of which unit is cut off by the power supply control unit 215 shown in FIG. 2, and the same components as those of FIG. 2 are given the same reference numerals.

As shown in FIG. 3, the power supply control unit 215 can turn on/off the power supply of a part encircled by 301 (a first power supply system). Further, the part encircled by 301 specifically includes the scanner engine 213, the scanner control unit 201, the CPU 202, the ROM 203, the printer engine 212, the engine control unit 206, the HDD 207, and the timer 208 or the like. The part encircled by 301 has a relatively large power consumption, and on the other hand, the part other than that encircled by 301 (a second power supply system) has a relatively small power consumption. Therefore, by cutting off power supply to this part that is encircled by 301, the power consumption can be decreased.

In the multifunction device 101, the power control unit 215 cuts off the power supply of the area represented by 301 (the first power supply system) during the transition from the normal mode to the power saving mode according to the control of the CPU 202, whereby low power is realized. On the other hand, during the return from the power saving mode to the normal mode, the power supply is turned on in this area represented by 301. Further, in the area other than that encircled by 301 (the second power supply unit), the power supply is maintained in the both modes, namely, the power saving mode and the normal mode.

The CPU 202 directs the transition to the power saving mode from the I/O control unit 209 and instructs the power supply control unit 215 to cut off power supply to the units in the area 301 if there is no job entry from the network control unit 201 for a given length of time. Thereby, the power supply control unit 215 cuts off power supply to the units located in the area 301 and this causes the multifunction device 101 to transition from the normal power mode to the power saving mode.

In addition, the power supply control unit 215 can receive a Power On signal 302 from each of the I/O control unit 209 and the network control unit 210 even in the power saving mode. Then, upon receiving this signal, the power supply control unit 215 supplies power to the units located in the area 301. As a result, the multifunction device 101 returns from the power saving mode to the normal mode.

Figure 4:
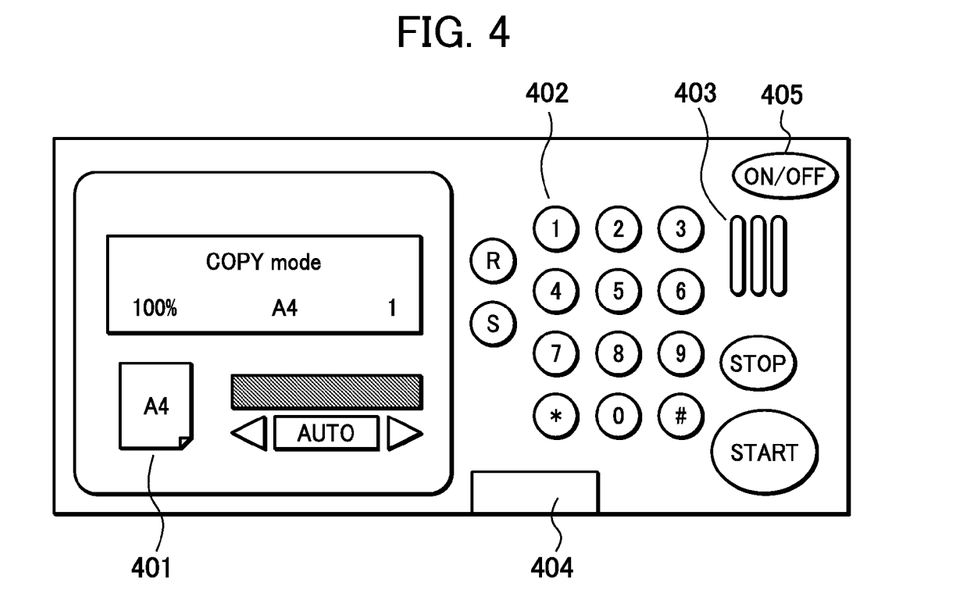
FIG. 4 is a plan view explaining a configuration of a user interface part shown in FIG. 2.

FIG. 4 is a plan view explaining a configuration of a user interface part 214 shown in FIG. 2.

In FIG. 4, a reference numeral 401 denotes a large-size touch panel, and a user can variously set the multifunction device 101 by operating the touch panel. A screen of FIG. 4 corresponds to a standby screen of a copy mode.

A reference numeral 402 denotes buttons of a numeric keypad for use in inputting numbers "0" to "9". An "S" button is a service button. By holding this button down, various service screens appear on the touch panel and the services besides copy can be carried out. An "R" button is a setting button. By holding this button, various setting screens appear on the touch panel and parameters can be set.

A reference numeral 403 denotes a speaker and the multifunction device 101 outputs voice and buzzer or the like from the speaker 403. A reference numeral 404 denotes a lamp, and when a sheet jams during printing and copying, the lamp 404 blinks. A reference numeral 405 denotes an ON/OFF button for power saving. The user can direct transition to the power saving mode and return from the power saving mode to the normal mode through operation of the buttons.

The following describes a software, which is a part to control the power saving mode of the multifunction device 101 shown in FIG. 1 with reference to FIG. 4.

Figure 5:
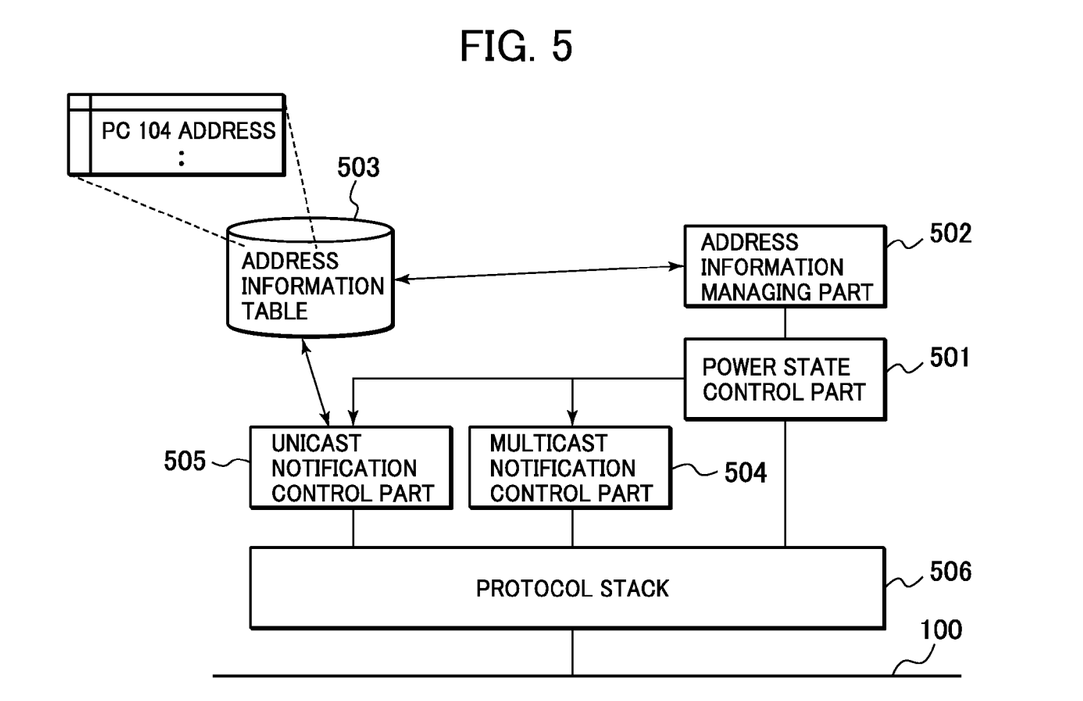
FIG. 5 is a software block diagram of a part serving to control a power saving mode of the multifunction device shown in FIG. 1.

FIG. 5 is a block diagram of the software, which is a part to control the power saving mode of the multifunction device 101 shown in FIG. 1. Further, each software shown here is realized in such a manner that the CPU 202 shown in FIG. 2 reads the program from the HDD 207, expands the program in the RAM 204, and executes the program expanded in the RAM 204.

In FIG. 5, a reference numeral 501 denotes a power state control part, which is a module to control transition into the power saving mode and return from the power saving mode. This power state control part 501 determines if the device transitions to the power saving mode or not and performs the transition processing to the power saving mode, setting of a return condition from the power saving mode, and processing when the device returns from the power saving mode or the like.

A reference numeral 502 denotes an address information managing part, which is a module to manage an address information table 503 according to the instruction from the power state control part 501 when the device returns from the power saving mode.

This address information table 503 is a table that stores unicast address information (for example, an IP address and a host name or the like) of a party notified of the state of the power saving mode.

In the case of adding address information when the device is returned from the power saving mode, the address information managing part 502 acquires the address information and stores this address information in the address information table 503 according to the instruction from the power state control part 501.

In addition, when the device transitions to the power saving mode or returns from the power saving mode, the power state control part 501 instructs a multicast notification control part 504 and a unicast notification control part 505 to transmit notification, respectively. Upon receiving this instruction, the multicast notification control part 504 transmits the notification of the power saving mode by a multicast via a protocol stack 506. Further, upon receiving the above instruction, first, the unicast notification control part 505 acquires unicast address information to be notified of from the address information table 503 via the address information managing part 502. Next, the unicast notification control part 505 transmits the notification of the power saving mode to the acquired unicast address information by a unicast via the protocol stack 506.

Further, the protocol stack 506 is a software group in which protocols necessary to accomplish a certain function on the network are built up in layers.

In addition, the address information table 503 is stored on the NVRAM 205 or the HDD 207, and when the power supply is turned on, the address information managing part 502 reads the address information table 503 from the NVRAM 205 or the HDD 207 and stores the same in the RAM 204. Further, when the address information table 503 in the RAM 204 is updated, the address information managing part 502 controls the address information table 503 stored in the NVRAM 205 or the HDD 207 to be updated.

Hereinbelow, the operation of a network device (e.g., multifunction device) in this embodiment will be described with reference to FIG. 6.

Figure 6:
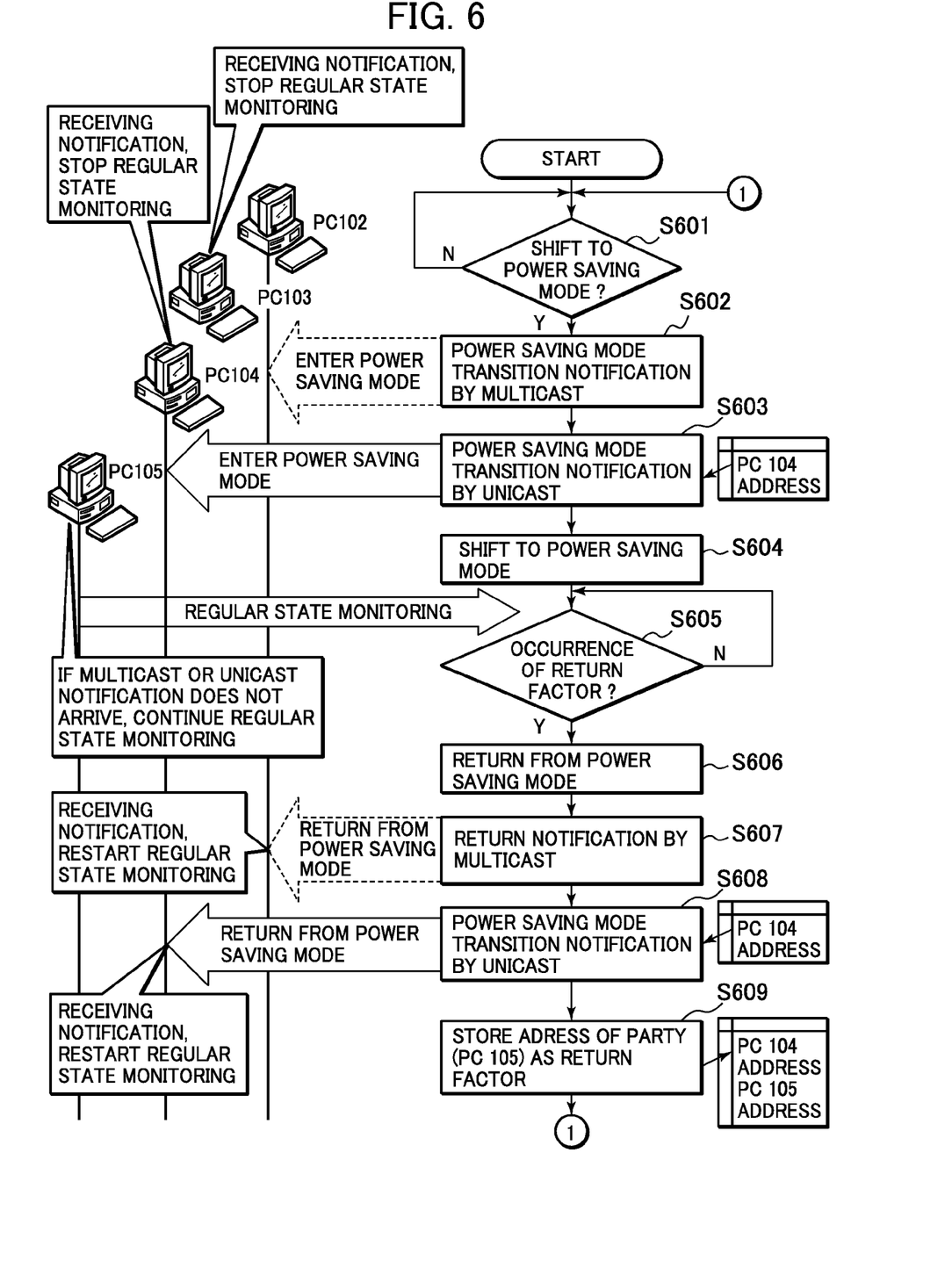
FIG. 6 is a flow chart showing an example of a first control processing procedure in the network device according to an embodiment of the present invention.

FIG. 6 is a flow chart showing an example of a first control processing procedure in the network device (e.g., multifunction device) of the present invention and this flow chart corresponds to the flow of transition to the power saving mode and return from the power saving mode of the multifunction device 101. Further, the processing of this flow chart is realized in such a manner that the CPU 202 shown in FIG. 2 reads the program stored in the HDD 207 to the RAM 204 and executes the software group (501, 502, 504 to 506) shown in FIG. 5. In FIG. 6, S601 to S609 represent each step. In addition, S605 and S606 represent steps to be executed by the power supply control unit 215 of the multifunction device 101.

First, in step S601, the power state control part 501 (executed by the CPU 202) determines whether to perform transition to the power saving mode in accordance with a transition condition such as, for example, a condition that the transition processing for the power saving mode is performed by the user or there is no job entry for a given length of time. Then, if the power state control part 501 determines to perform the transition to the power saving mode, the power state control part 501 carries out the processing of steps S602 and S603, first.

In step S602, the power state control part 501 causes the multicast notification control part 504 (executed by the CPU 202) to provide notification, to the multicast address, of information that the multifunction device 101 has transitioned to the power saving mode. This notification can be received by the PC 102 and the PC 103 in the network configuration shown in FIG. 1. On the other hand, the multicast packet does not arrive at the PC 104 and the PC 105 shown in FIG. 1.

Then, the PC 102 and the PC 103, having received the notification by the multicast packet, recognize that the multifunction device 101 has transitioned to the power saving mode and temporarily stop the regular state monitoring. By carrying out such a control process, the PC 102 and the PC 103 control the multifunction device 101 so as to avoid causing the multifunction device 101 to improperly return from the power saving mode.

In step S603, the power state control part 501 causes the unicast notification control part 505 to provide notification, to each address saved in the address information table 503, of information that the multifunction device 101 has transitioned to the power saving mode by a unicast. Thereby, the unicast notification control part 505 (executed by the CPU 202) transmits information indicating that the multifunction device 101 has transitioned to the power saving mode to each address in the address information table 503 by a unicast. According to the example shown in FIG. 6, the address of the PC 104 is saved in the address information table 503. Thereby, a notification is transmitted to the address of the PC 104.

Then, the PC 104, having received the notification, recognizes that the multifunction device 101 has transitioned to the power saving mode and temporarily stops the regular state monitoring. By performing the above control, the PC 104 controls the multifunction device 101 so as to avoid causing the multifunction device 101 to improperly return from the power saving mode.

When the processing of steps S602 and S602 are terminated, in step S604, the power state control part 501 transitions the multifunction device 101 to the power saving mode.

More specifically, the power state control part 501 saves the program running at that time (including 501, 502, and 504 to 506 shown in FIG. 5), a program counter, stack information, and register information of the CPU 202 or the like in the RAM 204. In other words, the power state control part 501 saves information, in the RAM 204, for restoring (restarting) the program running at that time from that state when the multifunction device 101 returns from the power saving mode. Further, the power state control part 501 instructs the power supply control unit 215 to cut off power supply of the part of the multifunction device represented by 301 in FIG. 3. As a result, the power supply control unit 215 cuts off power supply to the part represented by 301 in FIG. 3 and the multifunction device 101 transitions to the power saving mode.

Under this state, the PC 102, the PC 103, and the PC 104 recognize that the multifunction device 101 is in the state of the power saving mode, however, the PC 105 does not recognize it. Therefore, the PC 105 returns an inquiry packet regularly in order to perform the regular state monitoring.

In the case of receiving such a packet, in the multifunction device 101, the Power On signal 302 is transmitted from the network control unit 210 to the power control unit 215. Then, receiving this Power On signal 302, the power supply control unit 215 determines that a return factor is generated in step S605, and it carries out the return processing from the power saving mode in step S606. Specifically, the power supply control unit 215 applies power to all units located in the area 301 shown in FIG. 3 to return the multifunction device 101 from the power saving mode. Thereby, the CPU 202 transitions to an operating state. Then, the CPU 202 returns the program counter, the stack information, and the CPU register or the like saved on the RAM 204 to the CPU 202 and it controls the multifunction device 101 so as to restart the processing from the state immediately before the transition to the power saving mode (performs a return control).

Then, the power state control part 501 (executed by the CPU 202) carries out the processing of steps S607 and S608.

In step S607, the power state control part 501 causes the multicast notification control part 504 to provide notification, to the multicast address, of information that the multifunction device 101 has returned from the power saving mode. The PC 102 and the PC 103 can receive this notification. Then, the PC 102 and the PC 103, having received the notification by the multicast packet, recognize that the multifunction device 101 has returned from the power saving mode and they restart the regular state monitoring.

In the S608, the power state control part 501 causes the unicast notification control part 505 to provide notification, to the address saved in the address information table 503, of information that the multifunction device 101 has returned from the power saving mode. According to the example shown in FIG. 6, the address of the PC 104 is saved in the address information table 503. Therefore, the PC 104 receives the notification by the unicast packet and recognizes that the multifunction device 101 has returned from the power saving mode to restart the regular state monitoring.

Next, in step S609, the power state control part 501 performs the processing of adding the address of the device having had access that has turned out to be the return factor in step S605 (in FIG. 6, the address of the PC 105) to the address information table 503 to store it therein. Further, the addition of the address to the address information table 503 is carried out via the address information managing part 502. As a result, according to the example shown in FIG. 6, the addresses of the PC 104 and the PC 105 are stored in the address information table 503.

Then, the power state control part 501 returns the processing to step S601.

Thus, by sequentially storing the addresses of remote terminals having triggered the return, it is possible to reliably notify the terminals (the PC 104, the PC 105) beyond the reach of the multicast upon a next transition into a power saving mode.

Therefore, upon the next transition to the power saving mode, the PC 105 also can receive notification of the transition to the power saving mode, so that it is possible to temporarily stop the regular state monitoring.

Hereinbelow, the configuration of the PC 102 to the PC 105 shown in FIG. 1 will be described with reference to FIG. 7 and FIG. 8.

Figure 7:
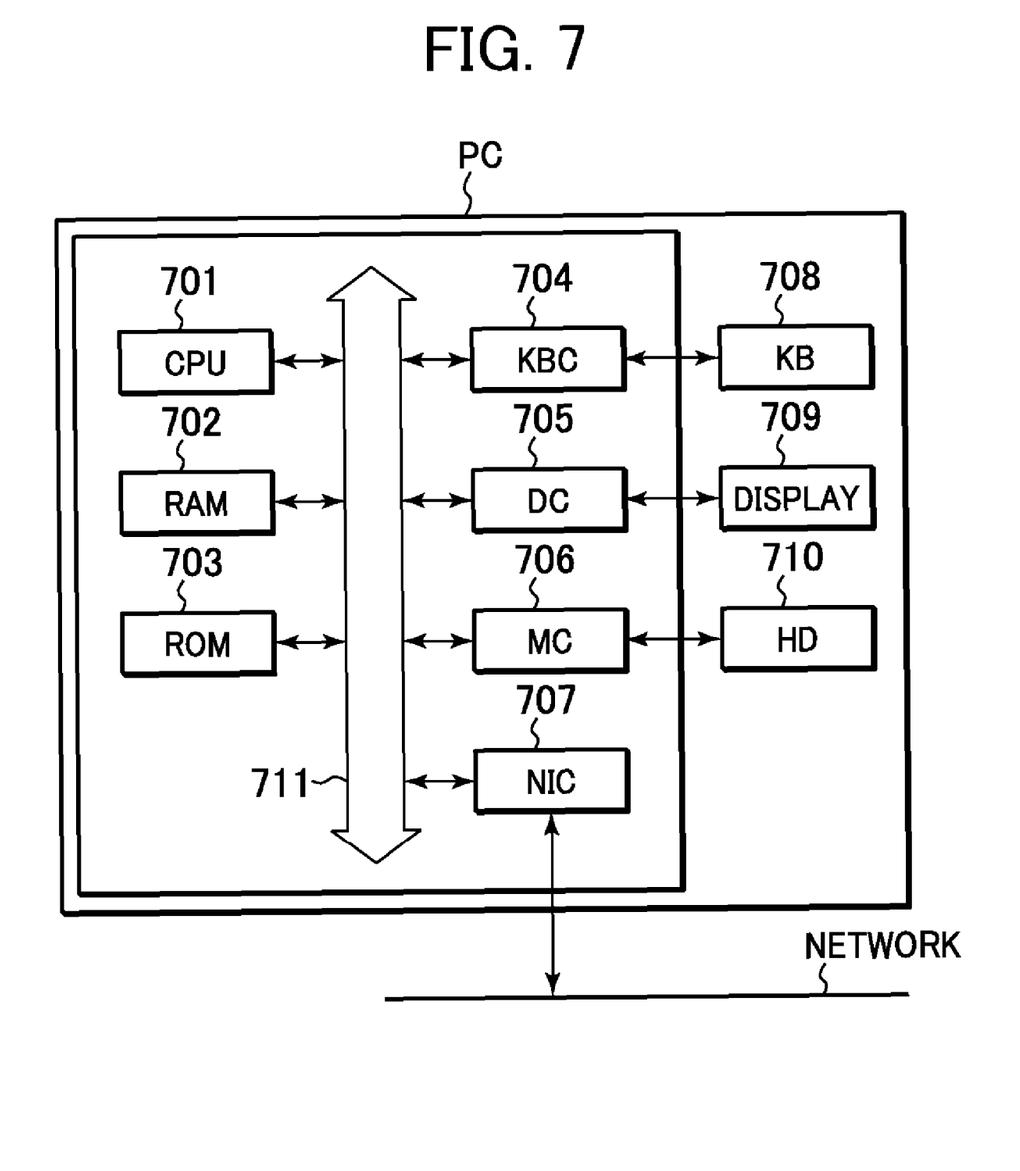
FIG. 7 is a block diagram showing an example of a hardware structure of the information processing devices shown in FIG. 1.

FIG. 7 is a block diagram showing an example of the hardware structure of the PC 102 to the PC 105 shown in FIG. 1.

In FIG. 7, a reference numeral 701 denotes a CPU. The CPU 7 controls each device that is connected to a system bus 711 on the basis of a program stored in a ROM 703, an external storage device 710, or other recording mediums so as to collectively control the entire PC.

A reference numeral 702 denotes a RAM, which functions as a main memory and a work area or the like of the CPU 701. A reference numeral 704 denotes a keyboard controller (KBC), which controls input from a keyboard (KB) 708 and a pointing device (not illustrated) such as, for example, a mouse. A reference numeral 705 denotes a display controller (DC), which controls display of a display 709.

A reference numeral 706 denotes a memory controller (MC), which controls access to a hard disk (HD) 710. A reference numeral 707 denotes a network interface card (NIC), which controls communication with the network, receives notification information related to the power saving mode from the device, and transmits a request to acquire information indicating the state of the device or the like.

The HDD 710 stores a regular state monitoring table shown in FIG. 9 described later.

Figure 8:
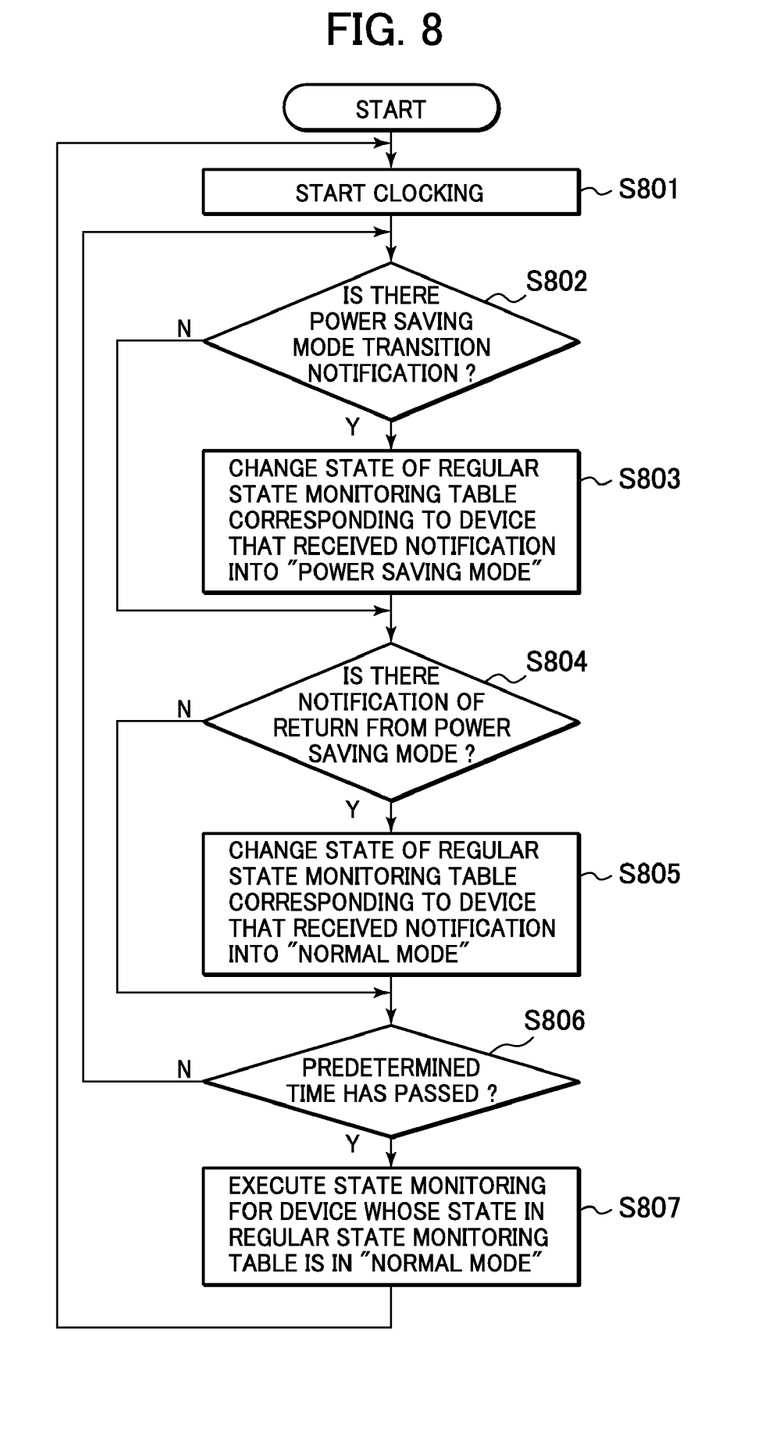
FIG. 8 is a flow chart showing an example of a first control processing procedure in the information processing device according to an embodiment of the present invention.

FIG. 8 is a flow chart showing an example of a first control processing procedure in the information processing device according to an embodiment of the present invention and this flow chart corresponds to the flow of the regular state monitoring processing in the PC 102 to the PC 105 shown in FIG. 1. Further, the processing of this flow chart is realized in such a manner that the CPU 701 shown in FIG. 7 reads the program stored in the HDD 710 to the RAM 702 and the CPU 701 executes this program. In FIG. 8, S801 to S807 indicate steps.

First, the CPU 701 starts clocking operation in step S801. Further, during clocking, a timer is reset to restart the clocking operation. Next, the CPU 701 determines if the notification indicating the network device (e.g., multifunction device 101) has transitioned to the power saving mode has been received from the device or not. In other words, the CPU 701 determines if the NIC 707 has received the notification indicating the multifunction device 101 has transitioned to the power saving mode from the device or not.

In step S802, if the CPU 701 determines that the notification indicating the multifunction device 101 has transitioned to the power saving mode has been received from the device, the processing proceeds to step S803. In step S803, the CPU 701 changes the state of the regular state monitoring table stored on the RAM 702 corresponding to the device, from which the notification indicating that the device went to the power saving mode has been received, into "a power saving mode". For example, when receiving the notification indicating that the device went to the power saving mode from the multifunction device 101, the regular state monitoring table is changed from FIG. 9A to FIG. 9B. Then, the processing proceeds to step S804.

FIG. 9 is a view showing an example of a regular state monitoring table stored on the RAM 702 shown in FIG. 7.

As shown in FIG. 9, the regular state monitoring table is configured by an address 901 of the device carrying out the regular state monitoring and a state 902.

Figure 9A:
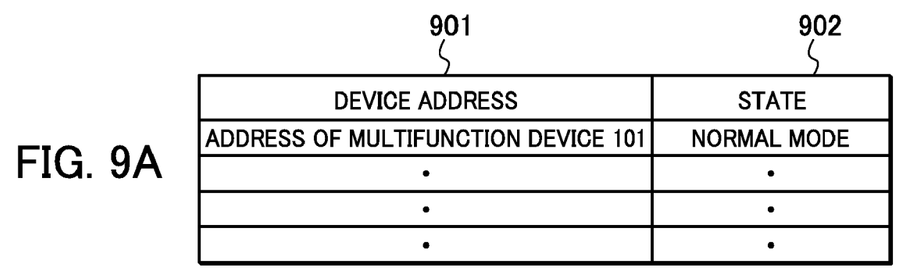
FIG. 9A is a view showing an example of a regular state monitoring table to be stored on a RAM shown in FIG. 7 where the state of the multifunction device is registered as "a normal mode".
Figure 9B:
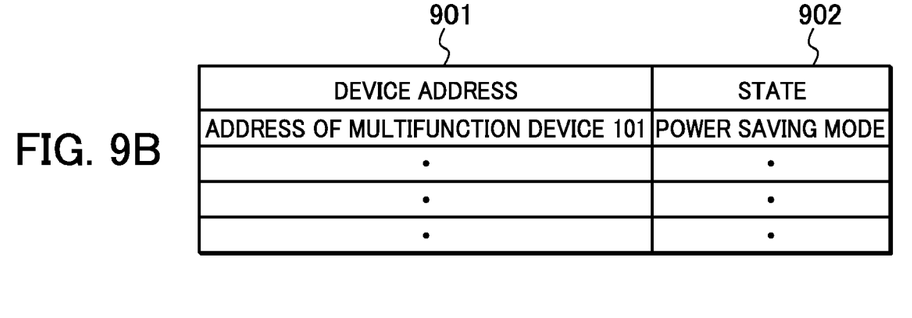
FIG. 9B is a view showing an example of a regular state monitoring table to be stored on a RAM shown in FIG. 7 where the state of the multifunction device is registered as "a power saving mode".

FIG. 9A corresponds to the case that the state of the multifunction device 101 is registered as "a normal mode". On the other hand, FIG. 9B corresponds to the case that the state of the multifunction device 101 is registered as "a power saving mode".

Hereinbelow, the description will return to the flow chart of FIG. 8.

On the other hand, if the CPU 701 determines that the notification indicating that the multifunction device has transitioned to the power saving mode has not been received from the device in step S802, the processing proceeds to step S804 directly.

In step S804, the CPU 701 determines if the notification indicating that the device returned from the power saving mode has been received from the device or not. In other words, the CPU 701 determines if the NIC 707 has received the notification indicating that the device returned from the power saving mode from the device or not.

In step S804, when the CPU 701 determines that the notification indicating that the device returned from the power saving mode has been received from the device, the processing proceeds to step S805. In step S805, the CPU 701 changes the state of the regular state monitoring table to be stored on the RAM 702 corresponding to the device, from which the notification indicating that the device returned from the power saving mode has been received, into "a normal mode". For example, when receiving the notification indicating that the device returned from the power saving mode from the multifunction device 101, the CPU 701 changes the regular state monitoring table from FIG. 9B to FIG. 9A. Then, the processing proceeds to step S806.

On the other hand, in step S804, when the CPU 701 determines that the notification indicating that the device returned from the power saving mode has not been received from the device, the processing proceeds to step S806 directly.

Next, in step S806, the CPU 701 determines if a predetermined time has passed since clocking is started in step S801 or not. If the CPU 701 determines that the predetermined time has not passed yet in step S806, the processing is returned to step S802.

On the other hand, if the CPU 701 determines that the predetermined time has passed in step S806, the processing proceeds to step S807.

In step S807, the CPU 701 sends an inquiry about the state (the state monitoring processing) to the device set in "the normal mode" (not in "the power saving mode") among the devices registered in the regular state monitoring table stored in the RAM 702. In other words, the CPU 701 acquires information on the state of the device or the like from the device by transmitting a state inquiry packet to the device. For example, in the case that the regular state monitoring table is in the state shown in FIG. 9A, the CPU 701 carries out the state monitoring processing for the multifunction device 101. On the other hand, in the case that the regular state monitoring table is in the state shown in FIG. 9B, the CPU 701 does not carry out the state monitoring processing for the multifunction device 101. In other words, the CPU 701 instructs the operation not to send an inquiry about the state to the device in the power saving mode.

Then, the CPU 701 returns the processing to step S801 to restart the clocking.

As described above, the multifunction device 101 notifies a management utility on the network of the fact that the device enters and exits the power saving state by a multicast packet when the device enters and exits the power saving state. Further, if the multifunction device 101 detects the release of the power saving mode by the regular information collection from the management utility (using SNMP or the like) in the power saving state, the multifunction device 101 stores the address of its host. Then, in the subsequent sleep period, the multifunction device 101 notifies the management utility of the power saving state by a unicast packet.

Thus, by adding information regarding the power saving mode to a multicast and notifying it by a unicast, the management utility located at the place where the multicast packet cannot be received also can detect the power saving state of the multifunction device 101. Due to such a configuration, it is possible to transmit a sleep transition notification more reliably so as to prevent the power saving state of the multifunction device 101 from being interrupted by the state inquiry from the monitoring device and it is possible to avoid returning from the power saving state as much as possible.

Further, according to an embodiment of the present embodiment, in step S609 shown in FIG. 6, the description was given to the configuration to additionally store the address of the party, which is a return factor, to the address information table 503. However, additional storage and deletion of the address to the address information table 503 is not limited to step S609 shown in FIG. 6. For example, the address can be additionally stored and deleted in and from the address information table 503 by the administrator through pressing down the "R" button shown in FIG. 4 to display a set screen on the touch panel 401 and operating the set screen.

Moreover, the address can be added and deleted to and from the address information table 503 by transmitting the instructions to add and delete the address to and from the address information table 503 from the PC 102 to the PC 105 to the multifunction device 101.

Second Embodiment

In the first embodiment, the description has been given of the configuration in which the PC 102 to the PC 105 monitoring the state receive a notification from the multifunction device 101 as shown in FIG. 6 and FIG. 8 and they do not inquire about the state at a network device (e.g., multifunction device) in the power saving mode. However, another embodiment may be configured in such a manner that the PC 102 to the PC 105 monitoring the state control the device in the power saving mode to extend an interval (a period) of the regular state monitoring. For example, the CPU 701 inquiries at the device in the normal mode in a first period, and on the other hand, the CPU 701 inquiries at the device in the power saving mode in a second period (longer than the first period). Due to such a configuration, it is also possible to decrease the inquiries at the device in the power saving mode and to accomplish the power saving control, which is more efficient than the conventional case.

Although the embodiments of the present invention have been described hereinabove, the present invention can be applied to an embodiment as a system, device, method, program, recording medium, or the like. Specifically, embodiments of the present invention can be applied to a system including multiple devices, or also can be applied to a device made up of a single device.

As described above, the multifunction device 101 transmits a sleep transition notification to the monitoring device when shifting to a sleep state. In addition, if the sleep is released by the state inquiry from another monitoring device during the sleep state, the address of that monitoring device is stored in the address information table 503. Then, the present embodiment has the configuration such that the sleep transition notification is also transmitted to this monitoring device when the multifunction device 101 enters the sleep state next time. Due to this configuration, it is possible to provide a device that can transmit the sleep transition notification more reliably so as to prevent its own sleep state from being interrupted by the state inquiry from the monitoring device.

As a result, it is possible to prevent such a situation that the sleep state of the device is interrupted by a state inquiry because a monitoring device (a monitoring device B) other than a monitoring device (a monitoring device A) that received the power saving mode transition notification sends the state inquiry to the device in the sleep state.

Accordingly, it is possible to prevent the situation that the device frequently returns from the power saving mode (the situation that the device cannot shift to the power saving mode efficiently) from being caused by the regular state monitoring or the like from the outside. This makes it possible to accomplish more efficient power saving control.

Hereinbelow, the description will be given to the configuration of a memory map of a storage medium for storing various data processing programs that can be read by a network device and an information processing device according to the present invention with reference to memory maps shown in FIG. 10 and FIG. 11.

Figure 10:
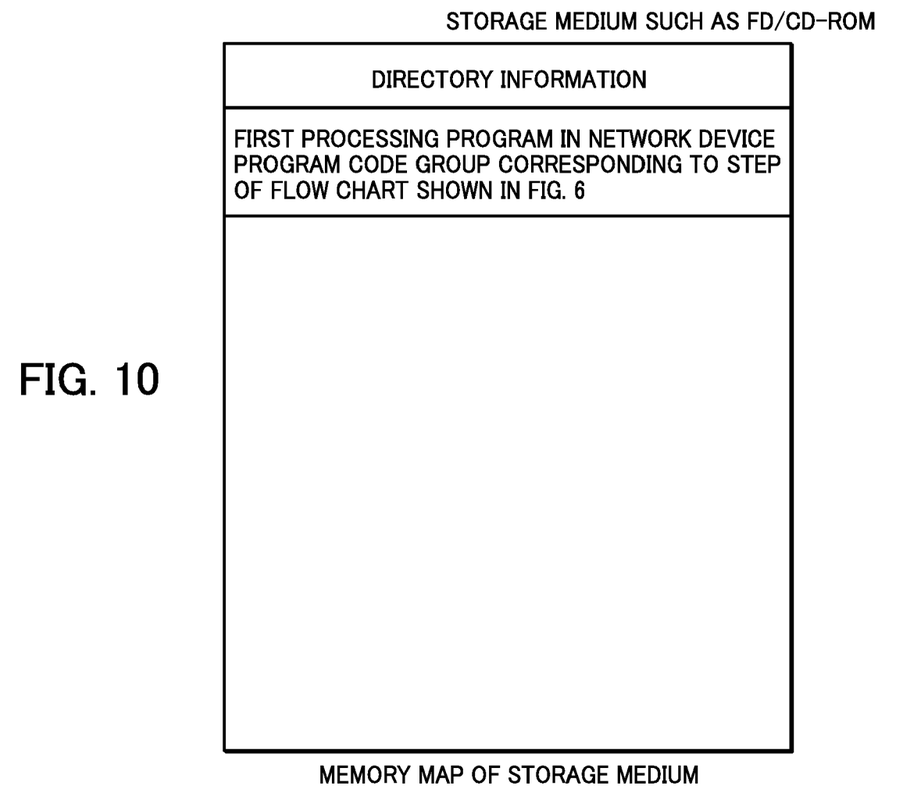
FIG. 10 is an explanatory view of a memory map of a storage medium (a recording medium) for storing various data processing programs that can be read by a network device (a multifunction device) according to an embodiment of the present invention.

FIG. 10 is an explanatory diagram of a memory map of a storage medium (a recording medium) for storing various data processing programs that can be read by the network device (the multifunction device 101) according to the present invention.

Figure 11:
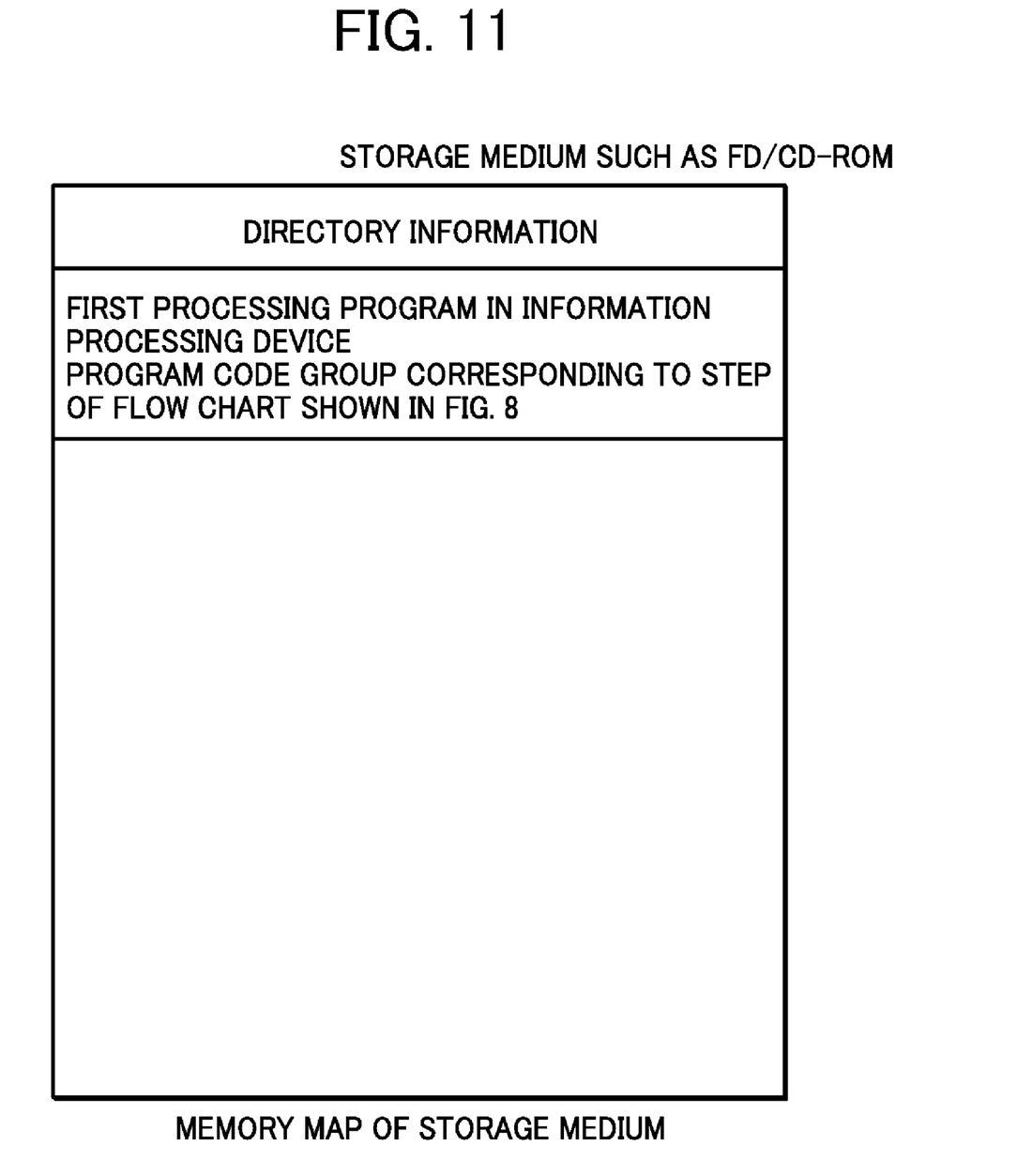
FIG. 11 is an explanatory view of a memory map of a storage medium (a recording medium) for storing various data processing programs that can be read by an information processing device (a PC).

FIG. 11 is an explanatory diagram of a memory map of a storage medium (a recording medium) for storing various data processing programs that can be read by the information processing device (the PC 102 to the PC 105).

Although not particularly illustrated, there is a case of storing information for managing a program group stored in the storage medium such as, for example, version information and a name of a creator or the like and of storing information depending on an OS on the program reading side or the like such as, for example, an icon to identify and display the program or the like.

Further, data depending on various programs is also managed by the above-described directory. In addition, there is a case of storing a program for decompression or the like when a program for installing various programs in a computer or a program to be installed is compressed.

The functions according to the present embodiment shown in FIG. 6 and FIG. 8 may be executed by the computer using a program installed from the outside. Then, in this case, the present invention can also be applied to a case where an information group including a program is provided to an output device from a storage medium such as a CD-ROM, a flash memory, and an FD or from an external storage medium via the network.

As described above, a system or a device is provided with a storage medium recording the program code of software for realizing the functions of the above embodiments. Then, it is obvious that the object of the present invention can also be achieved in such a manner that the computer of the system or the device (or a CPU or a MPU) reads and executes the program code stored in the storage medium.

In this case, the program code itself read from the storage medium realizes the new functions of the present invention, and as a result, the storage medium storing this program code therein constitutes the present invention.

Therefore, the program can be provided in any form such as, for example, in an object code, a program executed by an interpreter, or script data supplied to the OS only if it has the program functions.

As a storage medium for providing a program, for example, a flexible disk, a hard disk, an optical disk, a magneto-optical disk, an MO, a CD-ROM, a CD-R, a CD-RW, a magnetic tape, a nonvolatile memory card, a ROM, and a DVD or the like can be used.

In this case, the program code itself read from the storage medium realizes the functions of the above-described embodiments, and the storage medium storing this program code constitutes the present invention.

According to a method of providing a program, the program can also be provided by accessing an Internet website using a browser of a client computer and downloading the program itself according to the present invention from the website to a storage medium such as a hard disk. In addition, the program also can be provided by downloading the file compressed and including an automatic install function from the website to the storage medium such as a hard disk. Further, the program can also be realized by dividing the program code constituting the program according to the present invention into a plurality of files and downloading respective files from different websites. In other words, a WWW server, an FTP server, or the like that allows a plurality of users to download a program file for realizing the functional processing of the present invention by the computer is also included in the claims of the present invention.

In addition, the program according to the present invention is encrypted and stored in a storage medium such as a CD-ROM to be distributed to the users. Furthermore, a user who clears a predetermined condition is allowed to download key information for decryption from a website over the Internet. Still further, it is possible to realize the functions by executing the encrypted program using the key information to install it in the computer.

It is needless to say that the invention encompasses not only a case where the functions of the above embodiments are realized by executing the program code read by the computer, but also the case as described below. For example, it is obvious that the invention encompasses a case where the OS (operating system) running on the computer or the like performs a part or all of the actual processing on the basis of an instruction of the program code and thereby the functions of the embodiments are accomplished.

Further, the program code read from the storage medium is written in a memory, which is provided to a function expansion board inserted in the computer or a function expansion unit connected to the computer. Moreover, it goes without saying that the invention encompasses a case where the CPU or the like provided to the function expansion board or the function expansion unit performs a part or all of the actual processing on the basis of the instruction of the program code written in the memory and thereby the functions of the embodiments are accomplished.

In addition, the present invention can be applied to a system including multiple devices, or also can be applied to a device made up of a single device. Furthermore, it goes without saying that the present invention can also be applied to a case where the object of the present invention is achieved by providing a program to the system or the device. In this case, by reading the storage medium storing the program represented by software for achieving the present invention on the system or the device, the system or the device can enjoy the effect of the present invention.

The present invention is not limited to the above-described embodiments and various modifications (including organic combinations of the embodiments) are possible based on the subject matter of the present invention, and they are not excluded from the scope of the present invention.

Although various examples and various embodiments according to the present invention have been described hereinabove, those skilled in the art will recognize that the subject matter and the scope of the present invention are not limited to the specific description in this specification.

Furthermore, various modifications and applications cited in the above embodiments are entirely included in the present invention.

As described hereinabove, the network device according to the embodiments transmits information indicating that the device shifts to the power saving mode upon transition to the power saving mode to multicast address information. In addition, upon transition to the power saving mode, information indicating transition to the power saving mode is transmitted to each unicast address information stored in a memory. Furthermore, when the device is returned from the power saving mode by a predetermined access from another device, the network device is controlled so as to store address information of that device in the memory and provides notification by a unicast in the next transition to the power saving mode. Thus, the present embodiment has a configuration having a mechanism to reliably notify other terminals if the network device is in the power saving state or in the normal state. Thereby, it is possible to prevent the situation that the device cannot shift to the power saving mode efficiently because of a regular state monitoring or the like and it is possible to realize the power saving control more effectively.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-293815, filed Oct. 6, 2005, which is hereby incorporated by reference herein in its entirety.

What is claimed is:

1. An apparatus connectively coupled to a network, capable of shifting to a power saving mode when a predetermined condition is satisfied, wherein power consumption in the power saving mode is lower than in a normal state, the apparatus comprising:

a storing unit for storing an address of a notification destination to which a mode shifting notification indicating that the apparatus shifts to the power saving mode when the apparatus shifts to the power saving mode is transmitted;

a returning unit for returning a mode from the power saving mode to the normal state, in response to a predetermined access from a remote apparatus in the power saving mode;

an adding unit configured to add an address of the remote apparatus having triggered the returning process performed by the returning unit, into the storing unit, as the address of the notification destination; and a notifying unit configured to transmit, to the address stored in the storing unit, the mode shifting notification indicating that the apparatus shifts to the power saving mode when the apparatus shifts to the power saving mode, in order to prevent the remote apparatus from performing the predetermined access, wherein the notifying unit transmits the mode shifting by a unicast when the mode shifting notification is transmitted to the remote apparatus having the address added by the adding unit, and the notifying unit transmits the mode shifting notification by a multicast when the mode shifting notification is transmitted to the remote apparatus.

2. The apparatus according to claim 1, wherein the predetermined access is an access for monitoring a state of the apparatus.

3. The apparatus according to claim 1, further comprising a returning notification unit configured to transmit a mode returning notification indicating that the apparatus returns from the power saving mode, when the apparatus returns from the power saving mode.

4. The apparatus according to claim 3, wherein the remote apparatus stops performing the predetermined access in a case where the remote apparatus receives the mode shifting notification indicating that the apparatus shifts to the power saving mode, and wherein the remote apparatus restarts the predetermined access in a case where the mode returning notification indicating that the apparatus returns from the power saving mode.

5. The apparatus according to claim 3, wherein the predetermined access is performed regularly, and wherein the remote apparatus changes an interval of performance of the predetermined access such that the interval is extended in a case where the remote apparatus receives the mode shifting notification indicating that the apparatus shifts to the power saving mode, and turns the interval back to normal in a case where the remoter apparatus receives the mode returning notification indicating that the apparatus returns from the power saving mode.

6. A method for shifting an apparatus connectively coupled to a network to a power saving mode when a predetermined condition is satisfied, wherein power consumption in the power saving mode is lower than in a normal state, the method comprising:

storing an address of a notification destination to which a mode shifting notification indicating that the apparatus shifts to the power saving mode when the apparatus shifts to the power saving mode is transmitted;

returning a mode from the power saving mode to the normal state, in response to a predetermined access from a remote apparatus in the power saving mode;

adding an address of the remote apparatus having triggered the returning process as the address of the notification destination; and transmitting, to the address stored, the mode shifting notification indicating that the apparatus shifts to the power saving mode when the apparatus shifts to the power saving mode, in order to prevent the remote apparatus from performing the predetermined access, wherein the mode shifting notification is transmitted using a unicast when the mode shifting notification is transmitted to the remote apparatus having the address added, and wherein the mode shifting notification is transmitted using a multicast when the mode shifting notification is transmitted to the remote apparatus.

7. A computer-readable storage medium storing a computer-executable process, the computer-executable process causing a computer to implement a method for shifting an apparatus connectively coupled to a network to a power saving mode when a predetermined condition is satisfied, wherein power consumption in the power saving mode is lower than in a normal state, the method comprising:

storing an address of a notification destination to which a mode shifting notification indicating that the apparatus shifts to the power saving mode when the apparatus shifts to the power saving mode is transmitted;

returning a mode from the power saving mode to the normal state, in response to a predetermined access from a remote apparatus in the power saving mode;

adding an address of the remote apparatus having triggered the returning process as the address of the notification destination; and transmitting, to the address stored, the mode shifting notification indicating that the apparatus shifts to the power saving mode when the apparatus shifts to the power saving mode, in order to prevent the remote apparatus from performing the predetermined access, wherein the mode shifting notification is transmitted using a unicast when the mode shifting notification is transmitted to the remote apparatus having the address added, and wherein the mode shifting notification is transmitted using a multicast when the mode shifting notification is transmitted to the remote apparatus.

* * * * *